UNITED STATES PATENT OFFICE.

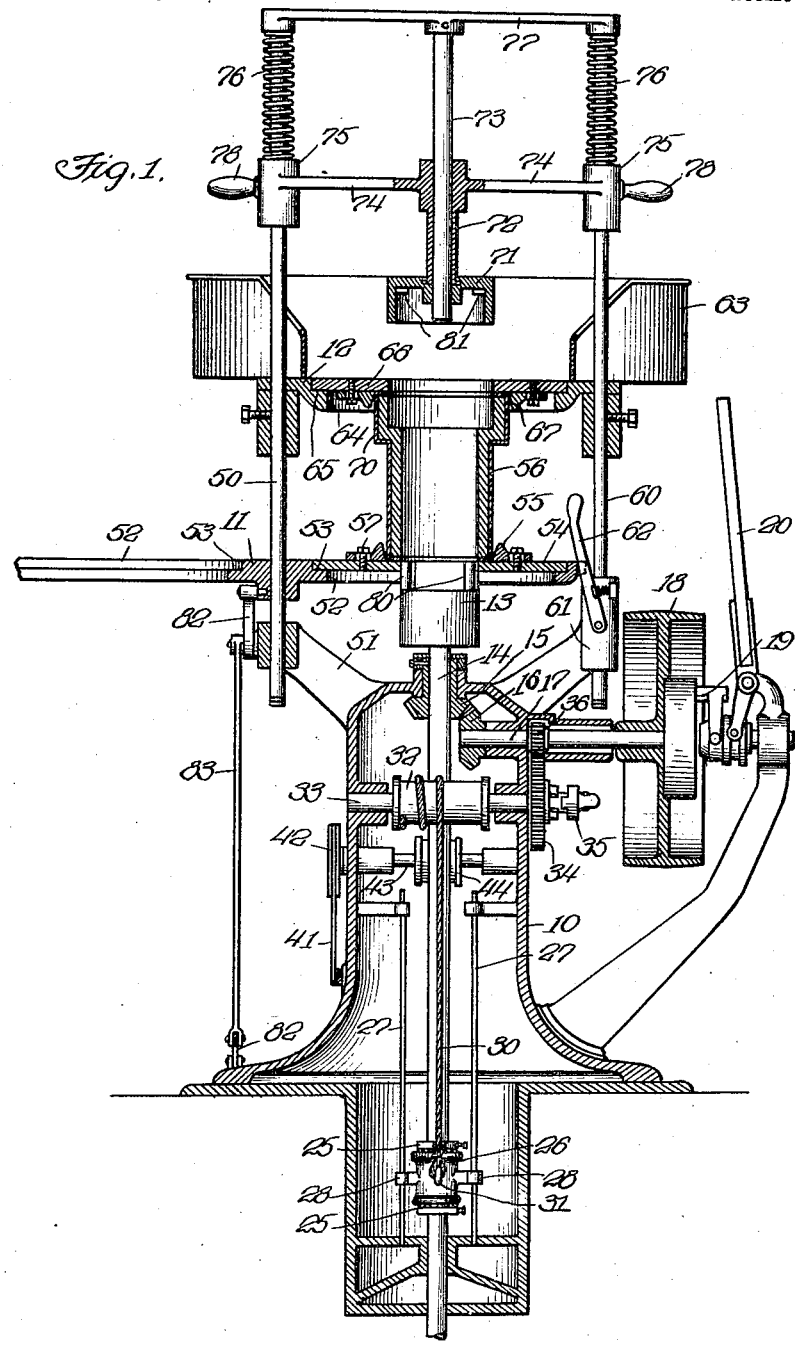

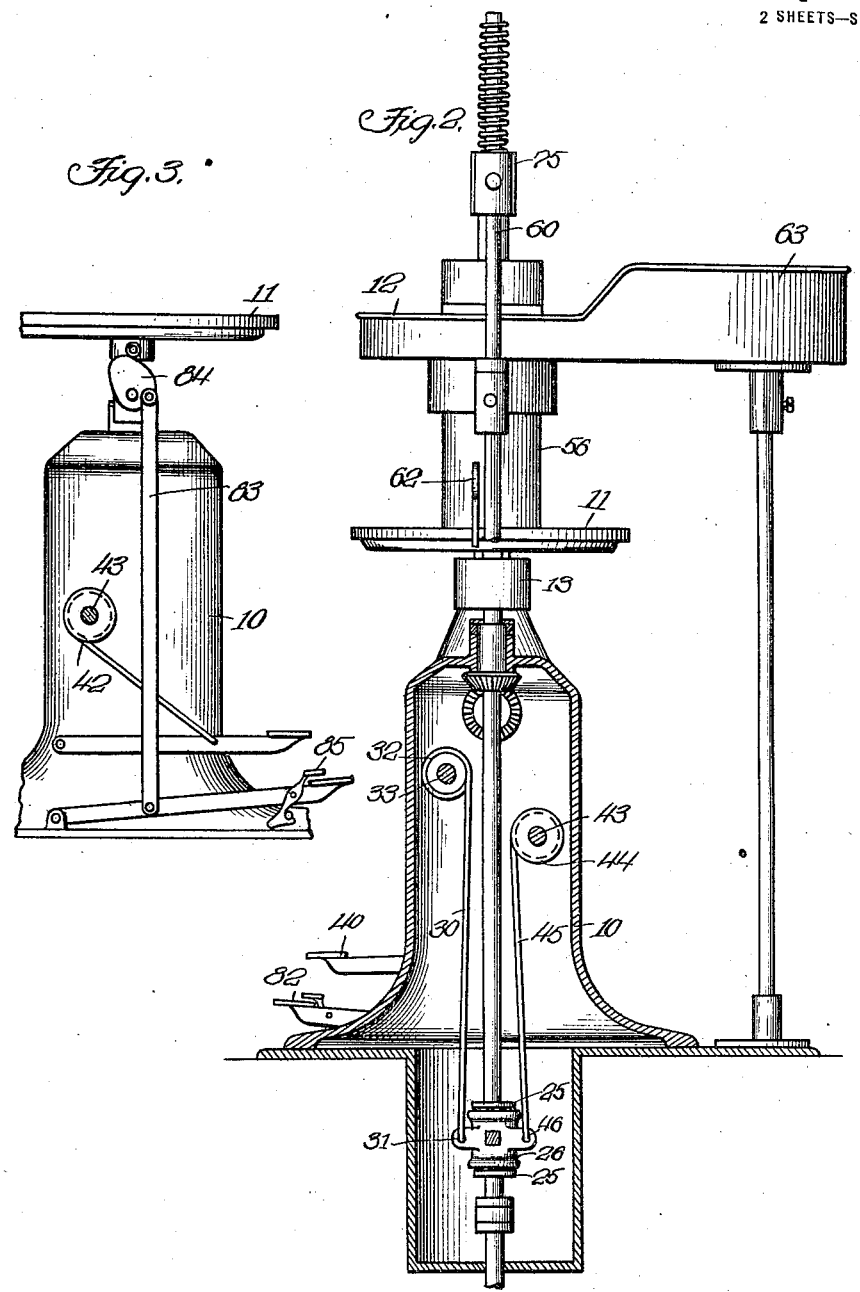

FREDERICK W. DUNN, OF CHICAGO, ILLINOIS.

MOLDING MACHINE.

1,412,046. Specification of Letters Patent. Patented Apr. 11, 1922.

Application filed August 14, 1920. Serial No. 403,533.

*To all whom it may concern:*

Be it known that I, FREDERICK W. DUNN, a citizen of the United States, residing at Chicago, in the county of Cook and State of Illinois, have invented certain new and useful Improvements in Molding Machines, of which the following is a specification.

This invention relates to molding machines.

It is particularly applicable in molding machines wherein the molded material is formed and compacted by centrifugal action.

One of the objects of this invention is to provide an improved molding machine.

Another object is to provide a molding machine adapted to mold readily a variety of objects of different shapes and sizes.

Another object is to provide a molding machine which is efficient, simple, reliable in operation and readily controlled.

Other objects and advantages will appear from the specification and claims.

An embodiment of the invention is illustrated in the accompanying drawings.

In the drawings—

Fig. 1 is a front central section of the machine.

Fig. 2 is a side elevation of the machine, the base being in section, and

Fig. 3 is a side elevation of the base.

The machine comprises, in general, a base or pedestal adjustably supporting a mold table and a packer and former. The packer and former compact the molded material within the mold by the effect of centrifugal action. The mechanism for operating the packer is located within the base or pedestal of the machine.

The variety of articles which may be molded with the machine are numerous and the articles may be employed for many uses. For example, the machine may be employed to produce drain tile, sewer or other flanged tile, building tile, silo tile, chimney tile, roofing tile, etc. Various sizes of products may be produced on the same machine and the the forms may be circular, oval, rectangular, triangular or of any irregular shape.

The machine illustrated is shown with a mold for making flanged tile or pipe.

The machine has a base 10, in the form of a pedestal, which supports the working part and houses the driving mechanism.

Pedestal 10 supports a mold table 11 on which the mold is carried, and a mold guide 12 which braces the upper end of the mold and maintains the same in vertical position.

The molded material is packed and formed within the mold by a rotatable and longitudinally movable packer head 13. Packer head 13 is fixed to the upper end of a plunger rod 14. Plunger rod 14 is feathered through a bevel gear wheel 15, journaled in a bearing located in an opening in the top of the pedestal. Gear wheel 15 meshes with a gear wheel 16 fixed to the end of a shaft 17. Shaft 17 is journaled in a bearing formed in the pedestal and has a pulley 18 rotatably mounted thereon.

Pulley 18 is belted to a suitable source of power and is connected to and disconnected from shaft 17 by a suitable clutch 19. Clutch 19 is controlled through a lever 20.

Plunger rod 14 has a pair of rings 25 adjustably secured thereto. Between rings 25 there is a sleeve 26 loosely encircling plunger rod 14. Anti-friction bearings are interposed between the rings and sleeve. The sleeve is guided and held against rotation by a pair of fixed rods 27, secured to the inner walls of the pedestal, and slidably movable thereon is a pair of lugs 28 projecting from the sleeve.

Plunger rod 14 and the packer head carried thereby are elevated by a cable 30. Cable 30 is secured at one end to a hook 31 on sleeve 26 and passes over a drum 32. The other end of the cable is secured to the drum.

Drum 32 is fixed to a shaft 33 which is journaled in bearings formed in the pedestal. Shaft 33 has a gear wheel 34 loosely mounted thereon but adapted to be secured thereto by a clutch 35. Gear wheel 34 meshes with a gear wheel 36 fixed on shaft 17.

The rotation of shaft 17, through pulley 18, rotates plunger rod 14 and packer head 13. It also serves to elevate and lower the plunger rod and packer head during their rotation, through rings 25, sleeve 26, cable 30, drum 32 and gear wheels 34 and 36.

The plunger rod also may be elevated manually to a comparatively slight extent. This movement is accomplished by depressing a treadle 40. Treadle 40 is pivoted to the pedestal and has a cable 41 secured thereto. Cable 41 passes over and has its other end secured to a pulley 42. Pulley 42 is secured to a shaft 43 journaled in bearings in the pedestal. Shaft 43 has a drum 44 fixed thereto. A cable 45 passes around and has one end secured to drum 44 and its other end secured to a lug 46 on sleeve 26.

When treadle 40 is depressed, the plunger rod and packer head are elevated to the position shown in Fig. 1. In this position the packer head closes the bottom of the mold, as will be hereinafter described.

Mold table 11, in the machine illustrated, is arranged to support two molds at the same time. Thus a mold may be filled while others are being removed and replaced. The table may be arranged for only one mold or for more than two as desired.

Mold table 11 is pivotally and adjustably supported on a rod 50. Rod 50 is adjustably carried by an arm 51 projecting upwardly from the pedestal.

The mold table comprises a metal plate having a pair of openings 52—52 therethrough. A ledge 53 is located at the upper edge of each of the openings 52 and serves as a seat for a die ring 54. Die ring 54 has an opening therethrough for passage of packer head 13. Lugs 55 when suitably placed on the die ring, serve as a gage for readily positioning the mold in proper position relative to the openings through the mold die, hold it in alignment with the openings and prevent the mold from being accidentally displaced.

A rod 60 is adjustably carried by an arm 61 which projects upwardly from the pedestal. Arm 61 has a spring pressed latch 62 pivoted thereto. Latch 62 cooperates with notches in mold table 11 to hold the table in proper position relative to the packer head and to allow the table to be quickly and readily positioned by rotation on its axis 50.

Rods 50 and 60 adjustably support the mold guide and brace 12. Mold guide 12 may extend rearwardly and be provided with a wall 63 to form a receptacle for the molded material. Mold guide 12 has an opening 64 therein. Opening 64 has a circumferential ledge 65 for seating a mold die 66. Mold die 66 has an opening in its center for the passage of the packer head and, on its underside, is provided with adjustable and removable lugs 67.

Mold 56, which is preferably of a divided type, may be made of metal or other suitable material. The mold has its inner wall formed in the size and shape of the article to be molded. In the drawings the mold is for making flanged bell end pipe, such as sewer tile. This mold is of circular cross section. The bore and outside diameter are uniform except for the bell or flange 70 near the top.

To form the larger inner diameter of the flange of the pipe a forming head 71 is provided. Head 71 is rotatably carried on a sleeve 72 which encircles a shaft 73. Sleeve 72 has radially projecting arms 74, the ends of which are provided with bosses 75. Bosses 75 have openings therethrough for sliding engagement with rods 50 and 60.

Tension springs 76, encircling rods 50 and 60, are connected to bosses 75 at one end and, at the other end, to a brace 77 interconnecting rods 50 and 60 at their tops. These springs tend to raise the forming head. The head may be manually depressed, however, by handles 78.

Packer head 13 is in the form of a cylinder having a substantially flat or slightly conical top. Pivotally mounted on the top of head 13 are a pair of shoes 80. Shoes 80 are made of suitable hard material such as chilled steel. Shoes 80 are adapted to operate with a pair of engaging members 81 in head 71 as will be hereinafter described.

To tightly hold the mold between mold dies 54 and 66 during the molding operation and to readily lower the mold table a short distance to allow a mold to be easily removed after an article has been molded, a treadle 82 is provided. Treadle 82 is pivoted to the pedestal and has a rod 83 pivoted thereto. Rod 83 is pivotally connected to a small cam 84 pivoted to the pedestal. Cam 84 engages a roller on the central boss of table 11. When treadle 82 is depressed, as shown in Fig. 3, cam 84 moves table 11 upwardly, thereby tightly clamping the mold in position between mold dies 54 and 66. The treadle is held in this position by a suitable latch 85.

When latch 85 and treadle 82 are released, the weight of the table lowers the same until the top edge of the mold is below the lower edge of adjustable lugs 67. Thereupon the table may be rotated on its axis 50 to move the molded article and position a new mold above the packer head.

The operation of the machine is briefly as follows:—

Mold dies 54 and 66 of the proper size and shape for the articles to be molded having been secured in place by table 11 and guide 12, respectively, the mold of the desired size and outline is then positioned on the table. Latch 62 is withdrawn and the table is rotated until the mold is over the packer head. Then treadle 82 is depressed and the mold is tightly clamped between mold dies 54 and 66. Next, treadle 40 is depressed and the packer head is raised until the top of the cylinder comes flush with the bottom of the mold.

The machine is now ready for the molded material. Any moldable material of suitable character is pushed out of a receptacle or tray 63, into the mold by the operator, and the mold is filled therewith. When the mold is filled to the desired extent, clutches 19 and 35 are thrown into active positions.

Thereupon the packer head begins to revolve and rise. The rotation of the head causes shoes 80 to compact the material on the sides of the mold and trowel the bore of the article to give the same a good finish. The packer head, at the same time, moves upwardly to make the bell of the tile. When the packer head reaches the upper portion of the tile to be formed, the operator depresses handle 78. Forming head 71 is thus lowered and shoes 80 engage members 81 and the forming head 71 is thereby rotated, to assist in forcing the material outwardly through the enlarged part and to form the greater internal diameter thereof.

Having described my invention what I claim as new and desire to secure by Letters Patent is:—

1. A molding machine having a mold support, a packer head, mechanism for rotating and driving the packer head through a mold on the support, and a forming head co-operating with and operated by the packer head to form and compact the molded article.

2. A molding machine having a rotatable and longitudinally movable packer head, a support for holding a mold, and a movable forming head co-operating with and operated by the packer head to compact and form a molded article within the mold.

3. A molding machine having a mold support, a packer head rotatably and longitudinally movable through a mold on the support, and a rotatable and longitudinally movable forming head co-operating with and operated by the packer head to compact and form a molded article within the mold.

4. A molding machine having a support for holding a mold, a rotatable and longitudinally movable packer head for compacting and forming a molded article within the mold by forcing the molded material outwardly against the inner wall of the mold, and a rotatable and longitudinally movable forming head rotated by the packer head and co-operating therewith to form a molded article within the mold.

5. A molding machine having a movable mold supporting table, a mold guide above the table and manually operable means for moving the table toward and from guide to clamp a mold between the same and to release the mold for ready removal.

6. A molding machine having a table for supporting an open ended mold, a packer head longitudinally movable through the mold to compact and form an article therein, power connections for driving the packer head through the mold, and manually operable means for moving the packer head to close the mold for the insertion of the molded material.

7. A molding machine having a pedestal, a mold support carried by the pedestal, a packer head rotatable and longitudinally movable into a mold carried by the support to compact and form a molded article within the mold, a drum, a cable interconnecting the drum and packer head to longitudinally move the packer head, and power connections for driving the drum.

8. A molding machine having a hollow base, a mold table and a mold guide supported on the base and adapted to clamp a mold between them, a rotatable packer head longitudinally movable in the mold, mechanism located in the base for rotating the packer head, a drum and cable within the base and acting to longitudinally move the packer head, and a forming head supported by the base and co-operating with the packer head to compact and form a molded article within the mold.

9. A molding machine having two spaced apart perforated mold dies, between which to contain and clamp a hollow mold; means to move the dies toward and from each other; a rotatable packer head movable through the mold and radially movable lugs adjustable around said perforations, on confronting sides to provide guides for the respective ends of the mold.

10. A molding machine having two spaced apart perforated mold die plates, between which to contain a hollow mold; means to move the plates toward and from each other to clamp and release the mold; a packer head movable through each die into the mold and a series of tapered lugs radially adjustable around said perforations on confronting surfaces thereof to guide the mold in place with respect to the perforations in the dies.

In testimony whereof I hereunto subscribed my name.

FREDERICK W. DUNN.